US008336031B2

(12) United States Patent
Cabillic et al.

(10) Patent No.: US 8,336,031 B2

(45) Date of Patent: Dec. 18, 2012

(54) METHOD AND SYSTEM OF PERFORMING THREAD SCHEDULING

(75) Inventors: Gilbert Cabillic, Brece (FR); Jean-Philippe Lesot, Argentre du Plessis (FR)

(73) Assignee: Texas Instruments Incorporated, Dallas, TX (US)

( * ) Notice: Subject to any disclaimer, the term of this patent is extended or adjusted under 35 U.S.C. 154(b) by 1323 days.

(21) Appl. No.: 11/932,384

(22) Filed: Oct. 31, 2007

(65) Prior Publication Data

US 2009/0089563 A1 Apr. 2, 2009

(30) Foreign Application Priority Data

Sep. 28, 2007 (EP) .................................... 07291167

(51) Int. Cl.
*G06F 9/44* (2006.01)
*G06F 9/45* (2006.01)

(52) U.S. Cl. ......... 717/127; 717/124; 717/149; 717/161

(58) Field of Classification Search ........................ None
See application file for complete search history.

(56) References Cited

U.S. PATENT DOCUMENTS 5,953,530 A * 9/1999 Rishi et al. .................... 717/127
7,373,640 B1 * 5/2008 English et al. ................ 717/149
7,752,605 B2 * 7/2010 Qadeer et al. ................. 717/127
7,752,610 B2 * 7/2010 Cabillic et al. ................ 717/148
7,926,035 B2 * 4/2011 Musuvathi et al. ........... 717/124
8,245,207 B1 * 8/2012 English et al. ................ 717/149
2004/0221269 A1 * 11/2004 Ray et al. ...................... 717/124
2004/0221271 A1 * 11/2004 Zeman et al. ................. 717/127
2006/0026566 A1 * 2/2006 Cabillic et al. ................ 717/118
2006/0075393 A1 * 4/2006 Schmidt ........................ 717/161
2006/0130062 A1 * 6/2006 Burdick et al. ............... 718/100
2006/0155905 A1 * 7/2006 Leino et al. ................... 710/243
2008/0092122 A1 * 4/2008 Caprihan et al. .............. 717/127

OTHER PUBLICATIONS

Matt Buchanan et al, "Coordinated Thread Scheduling for Workstation Clusters Under Windows NT", Aug. 1997 USENIX window workshop, 8 pages, <http://static.usenix.org/publications/library/proceedings/usenix-nt97/full_papers/buchanan/buchanan.pdf>.*

M.L. Powell et al, "SunOS Multi-thread Architecture", 1991 USENIX, 14 pages, <ftp://crimson.ihg.uni-duisburg.de/Solaris/docs/multi_thread.pdf>.*

Mario Aldea Rivas et al, "POSIX-Compatible Application-Defined Scheduling in MaRTE OS", 2002 IEEE, 9 pages, <http://ieeexplore.ieee.org/stamp/stamp.jsp?tp=&arnumber=1019186>.*

U. Brinkschulte, C. Krakowski, "Real-time Scheduling on Multithreaded Processors", 2000 IEEE, pp. 155-159, <http://ieeexplore.ieee.org/stamp/stamp.jsp?tp=&arnumber=896384>.*

(Continued)

*Primary Examiner* — Thuy Dao
*Assistant Examiner* — Cuong V Luu
(74) *Attorney, Agent, or Firm* — Ronald O. Neerings; Wade James Brady, III; Frederick J. Telecky, Jr.

(57) ABSTRACT

A method and system of performing thread scheduling. At least some of the illustrative embodiments are computer-readable mediums storing a program that, when executed by a processor of a host system, causes the processor to instantiate a CPU object that represents a processor abstraction, create a CPU context object that represents a thread abstraction (wherein the CPU context object is associated to a method, and wherein the CPU context object is mapped onto the CPU object), and execute the method within the CPU object.

18 Claims, 4 Drawing Sheets

OTHER PUBLICATIONS

Ron Gabor et al, "Fairness and Throughput in Switch on Event Multithreading", 2006 IEEE, 12 pages, <http://ieeexplore.ieee.org/stamp/stamp.jsp?tp=&arnumber=4041843>.*

Stuart Fiske et al, "Thread Prioritization: A Thread Scheduling Mechanism for Multiple-Context Parallel Processors", 1995 IEEE, pp. 210-221.*

* cited by examiner

BYTECODE
112

JVM
100
RESOURCE MANAGER
API
CONFIGURATION
108
120
122
124
118
110
JVP
104
COMPILER
JEK
116
MPU
I/O
JSM
102
MEMORY
106
DISPLAY
114

300
320
322

324
326
CPU CONTEXT OBJECT 1
CPU CONTEXT OBJECT 2
CPU CONTEXT OBJECT 3
CPU CONTEXT OBJECT N
JAVA SCHEDULER
318
CPU OBJECT 1
CPU OBJECT 2
CPU OBJECT 3
CPU OBJECT N
VOLATILE FIELD
VOLATILE FIELD
VOLATILE FIELD
VOLATILE FIELD
304
308
312
316
302
306
310
314

*FIG. 2*

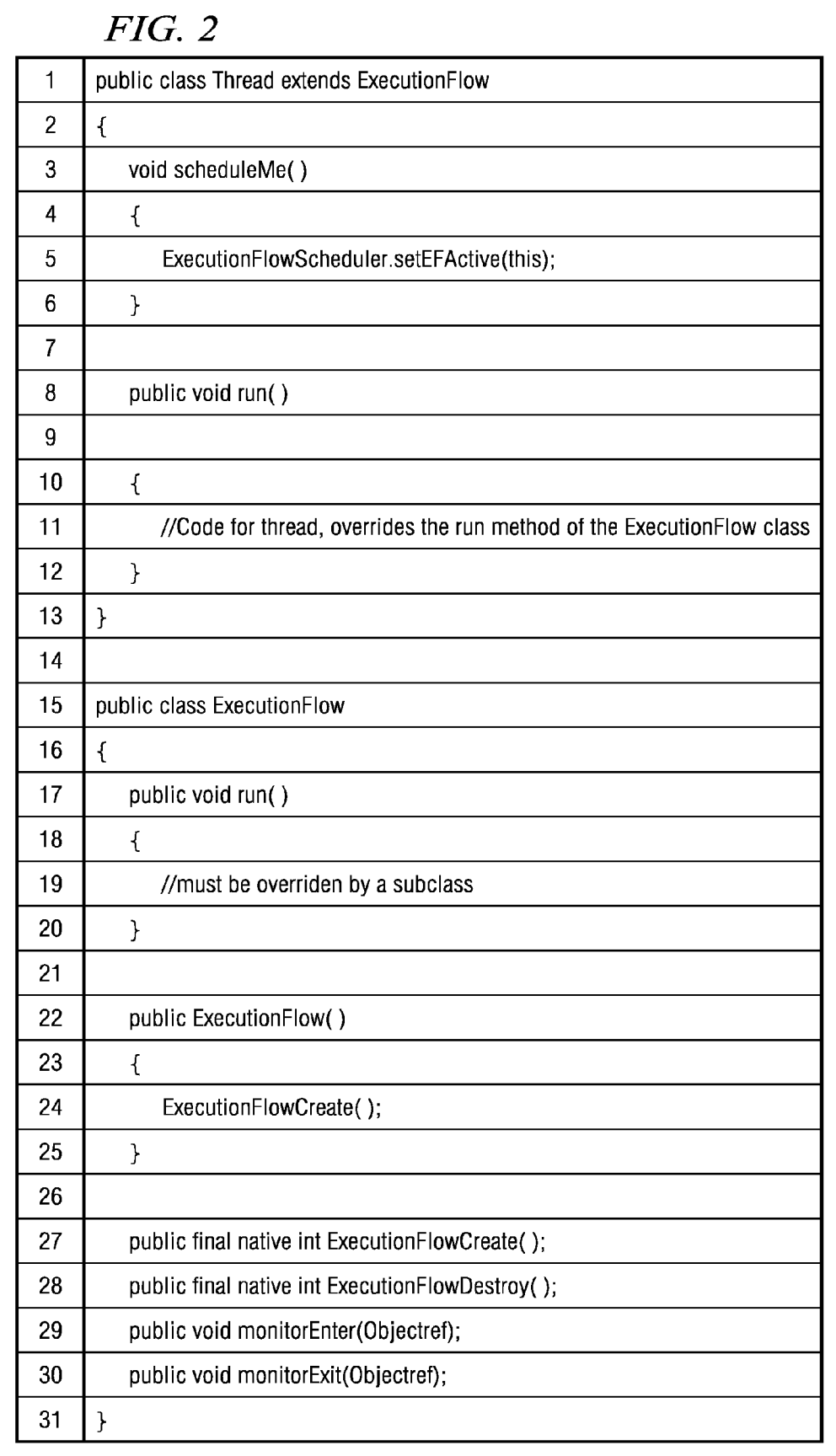

```
public class Thread extends ExecutionFlow
{
    void scheduleMe( )
    {
        ExecutionFlowScheduler.setEFActive(this);
    }

    public void run( )

    {
        //Code for thread, overrides the run method of the ExecutionFlow class
    }
}

public class ExecutionFlow
{
    public void run( )
    {
        //must be overriden by a subclass
    }

    public ExecutionFlow( )
    {
        ExecutionFlowCreate( );
    }

    public final native int ExecutionFlowCreate( );
    public final native int ExecutionFlowDestroy( );
    public void monitorEnter(Objectref);
    public void monitorExit(Objectref);
}
```

METHOD AND SYSTEM OF PERFORMING THREAD SCHEDULING

CROSS-REFERENCE TO RELATED APPLICATION

The present application claims priority to EP Application No. 07291167.0, filed on Sep. 28, 2007, hereby incorporated herein by reference.

BACKGROUND

Java™ is a programming language that, at the source code level, is similar to object oriented programming languages such as C++. Java language source code is compiled into an intermediate representation based on a plurality of "bytecodes" that define specific actions. In some implementations, the bytecodes are further compiled to machine language for a particular processor. In order to speed the execution of Java language programs, some processors are specifically designed to execute some of the Java bytecodes directly. Many times, a processor that directly executes Java bytecodes is paired with a general purpose processor to accelerate Java program execution.

Moreover, threads may be used to concurrently perform different tasks within the same processor. A thread may be generically defined as an independent flow of control or stream of execution within an executing application. A thread may comprise a context (e.g., a program counter and a register set) and an instruction sequence that can be executed independently of other instruction sequences. The Java programming language specification provides a thread API, java.lang.thread, that may be used to implement multiple threads of execution within a Java program, and imposes a minimum priority-based thread scheduling policy on implementations of the Java Virtual Machine (JVM). In many JVM implementations, Java threads are implemented on the native threading model of a non-Java operating system and the scheduler of the operating system controls the scheduling of the Java threads.

SUMMARY

A method and system of performing thread scheduling. At least some of the illustrative embodiments are a computer-readable medium storing a program that, when executed by a processor of a host system, causes the processor to instantiate a CPU object that represents a processor abstraction, create a CPU context object that represents a thread abstraction (wherein the CPU context object is associated to a method, and wherein the CPU context object is mapped onto the CPU object), and execute the method within the CPU object.

Other illustrative embodiments are computer systems comprising a processor that executes bytecodes and a memory coupled to the processor. The processor instantiates a CPU object that represents a processor abstraction. The processor creates CPU context object that represents a thread abstraction (wherein the CPU context object is associated to a method, and wherein the CPU context object is mapped onto the CPU object). The processor executes the method within the CPU object.

BRIEF DESCRIPTION OF THE DRAWINGS

For a more detailed description of the various embodiments, reference will now be made to the accompanying drawings, wherein:

FIG. 2 illustrates a Java source code example in accordance with some embodiments of the invention;

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
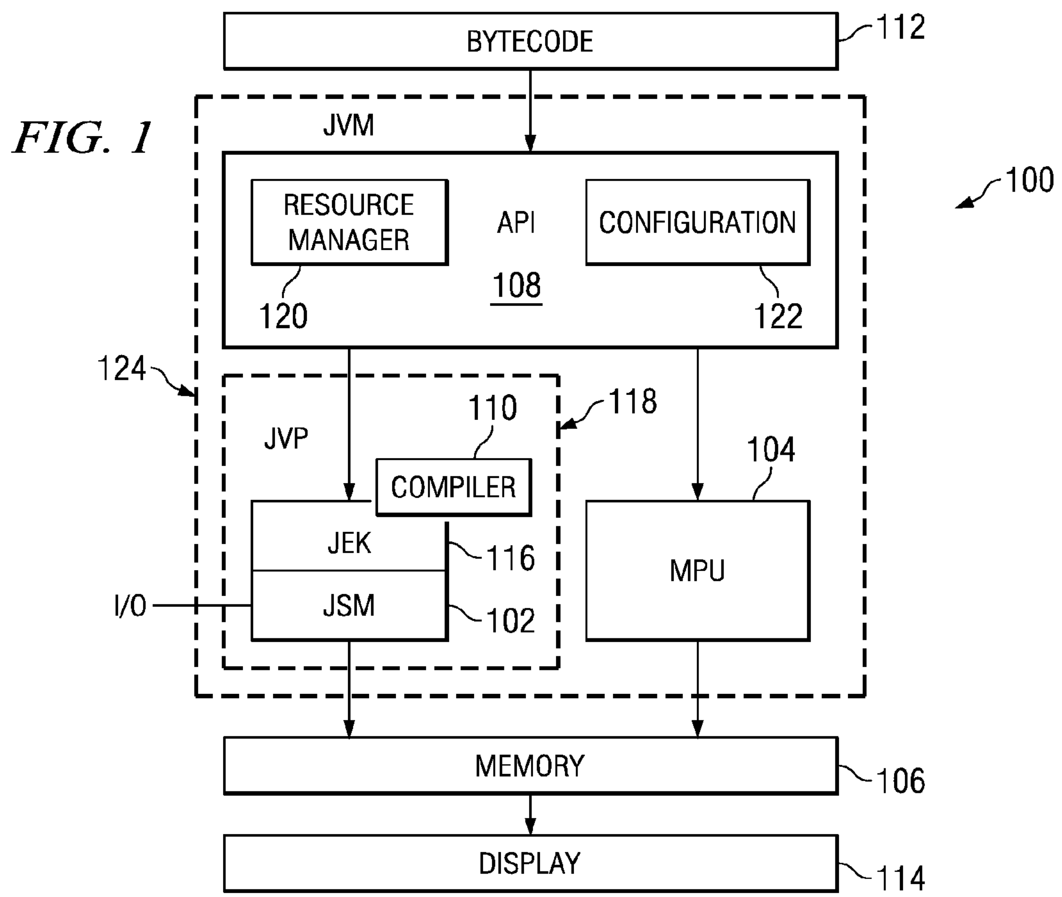
FIG. 1 illustrates a diagram of a system in accordance with embodiments of the invention comprising a Java Stack Machine (JSM)

FIG. 1 illustrates a system 100 in accordance with at least some embodiments. In particular, the system 100 comprises at least one processor 102. Processor 102 is referred to for purposes of this disclosure as a Java Stack Machine (JSM) 102. The JSM 102 comprises an interface to one or more input/output (I/O) devices, such as a keypad to permit a user to control various aspects of the system 100. In addition, data streams may be received from the I/O space into the JSM 102 to be processed by the JSM 102.

Optional processor 104 may be referred to as a Micro-Processor Unit (MPU). System 100 may also comprise memory 106 coupled to both the JSM 102 and MPU 104 and thus accessible by both processors. A portion of the memory 106 may be shared by both processors, and if desired, other portions of the memory 106 may be designated as private to one processor or the other. The memory 106 may be further coupled to a display 114.

System 100 also comprises a Java virtual machine (JVM) 124. The JVM 124 may comprise an Application Programming Interface (API) implementation 108 and a Java Virtual Processor (JVP) 118 (discussed more below). The API is compliant with the JVM specification and with the Java language specification. The API implementation 108 comprises a resource manager 120 and a configuration 122. The resource manager 120 manages resource sharing between multiple threads and/or applications running on the system 100. The configuration 122 provides applications with an API, which API is used to access base functionalities of the system.

The JVP 118 may comprise a combination of software and hardware. The software may comprise a compiler 110 and a JSM Execution Kernel (JEK) 116. The JEK 116 comprises software that is executable within the JSM 102, such as a class loader, bytecode verifier, garbage collector, and firmware to interpret the bytecodes that are not directly executed on the JSM processor 102. Thus, the hardware of the JVP 118 may comprise the JSM 102. The JVP 118 provides a layer of abstraction between the API 108 and a physical hardware platform (e.g., JSM 102) that executes Java bytecodes. Other components may be present as well.

Java language source code is converted or compiled to a series of bytecodes 112, with each individual one of the bytecodes referred to as an "opcode." Bytecodes 112 may be provided to the JEK 116, possibly compiled by compiler 110, and provided to the JSM 102. When appropriate, the JVP 118 may direct some method execution to the MPU 104.

The MPU 104 also may execute non-Java instructions. For example, the MPU 104 may host an operating system (O/S) which performs various functions such as system memory management, system task management and most or all other native tasks running on the system, and management of the display 114. Java code, executed on the JVP 118, may be used to perform any one of a variety of applications such as multimedia, games or web based applications in the system 100, while non-Java code, which may comprise the O/S and other native applications, may run on the MPU 104.

As discussed above, the JVP 118 provides a layer of abstraction. In particular, the JVP 118 is a virtual hardware platform that is compatible with any Java API, any real hardware/software platform that may comprise a JSM processor, or any JVM implementation. In some exemplary embodiments, the JVP 118 comprises a JEK core that has an execution engine, a memory management component, and a compiler. The execution engine may comprise a Bytecode engine, a class loader, a notification manager, and an external method interface. The memory management component may comprise a memory allocator, an object mapper for physically constrained objects, a garbage collector, a memory defragmentor, and a swapper. The compiler may comprise a dynamic compiler and provide code buffer management. The JEK core may also comprise firmware to facilitate the execution of Java Bytecodes on the JSM processor.

The JVP 118 also provides the API 108 with methods to create software class loaders. A class loader loads classes used by an application at runtime. Other hardware components of the hardware platform or software components are virtualized within the JEK 116 as Java Virtual Devices (JVD) that communicate with the JEK core. Each JVD comprises some combination of fields, methods, and notifications. The fields may comprise standard Java fields or may be mapped to a predefined or constrained physical memory space, wherein the constraint may be due to hardware or software. The fields may also comprise a map to indirect memories. The methods may comprise bytecodes, JSM native code, hardware instructions, or may use any kind of native interface such as a Java Native Interface (JNI) or a KVM Native Interface (KNI). The notifications may be initiated by an event, for example, a hardware interrupt, or from software. Additionally, the JEK core manages native interface links and the notification mechanism provides a way to implement flexible monitoring.

Threads may be used to give the appearance of concurrently performing different tasks within the same processor, such as the JVP 118 or within a plurality of abstracted processors (discussed below). A thread may be defined as an independent flow of control or stream of execution within an executing application. A thread comprises a context (e.g., a program counter and a register set) and an instruction sequence that is executed independently of other instruction sequences. Java threads may be abstracted on a single processor, and context switching may be accomplished via APIs. However, in some embodiments, Java threads may be abstracted for execution within a plurality of abstracted processors, and the context switching may be accomplished by a non-native Java Scheduler (i.e., written entirely in Java) by way of an object field as opposed to relying on the APIs (discussed further below).

The Java API 108 may comprise a Java scheduler API, an execution flow scheduler API, a thread API, and an execution flow API. The execution flow API is presented by an ExecutionFlow class that abstracts the execution flow context of an underlying low-level runtime of the system 100. An example implementation of an ExecutionFlow class is shown in FIG. 2. One of ordinary skill will appreciate that this code sequence is presented by way of example only and other implementations are possible and fall within the scope of this disclosure. Functionality comprised in an ExecutionFlow class is explained below with reference to this example implementation.

The ExecutionFlow class of FIG. 2 is designed to be extended, i.e., subclassed. As such, the execution flow API comprises a method invoked by the JVP 118 to execute the instructions of an execution flow, i.e., an ExecutionFlow execution method (lines 17-20). Note that the ExecutionFlow execution method is entitled "run" in the example and is referred to as a "run method" herein. This run method is overridden by any class extending the ExecutionFlow class to provide an implementation that comprises the instructions.

The ExecutionFlow class may also comprise a constructor that creates a native execution flow context when an object of subclass of the ExecutionFlow class is instantiated (lines 22-25). The constructor calls a native method to create the native execution flow context (i.e., an ExecutionFlowCreate method). In other embodiments, the native execution flow context may be created after the object is instantiated by an invocation of a native method that creates the execution flow context (e.g., line 27).

In some embodiments, when an object instantiated in the memory 106 of the system 100 is no longer needed, the memory allocated to that object is freed for reuse (i.e., destroyed) by the garbage collector in the JVP 118. Therefore, an object of a subclass of the ExecutionFlow class that is no longer needed is eventually destroyed by the garbage collector. However, in some embodiments of the system 100, the low-level runtime may provide a predetermined, static number of execution flow contexts. In such embodiments, the ExecutionFlow class may comprise a native method that may be invoked to indicate to the low-level runtime that an object of a subclass of the ExecutionFlow class is no longer using an execution flow context (i.e., an ExecutionFlowDestroy method) (line 28). This allows the execution flow context to be re-used even if the garbage collector has not yet destroyed the object.

As is explained in more detail below, threads of the Java applications and the Java operating system are implemented as subclasses of the ExecutionFlow class. In some embodiments, multiple threads may run simultaneously. The possibility exists that two threads may attempt to access the same data simultaneously or one thread may attempt to retrieve data that has not yet been provided by another thread.

The JVP 118 implements thread synchronization as specified in the Java language specification and the Java virtual machine specification. Each Java object is allocated a monitor when the object is created. If a method of an object or a code segment of a method is implemented using the Java keyword "synchronized," the JVP 118 uses the monitor to control access to the synchronized method or code segment. When the synchronized method or code segment is executed by a thread, the thread acquires the monitor while executing the method or code segment. After the method or code segment is executed, the thread releases the monitor. A thread that attempts to execute a synchronized method or code segment of an object whose monitor is taken by another thread waits until that thread releases the monitor.

The illustrative ExecutionFlow class comprises a method that may be invoked by the JVP 118 to notify a Java thread scheduler (discussed more below) that a currently executing thread has attempted to execute a synchronized method or code segment of an object whose monitor is taken (i.e., a monitorEnter method) (line 29). Upon receiving such notification, the Java thread scheduler may halt the execution of the current thread and place it in a queue to wait for the monitor to be released. The ExecutionFlow class also comprises a method that may be invoked by the JVP 118 to notify the Java operating system that a monitor has been released. Upon receiving such notification, the Java operating system reschedules any threads that can be run, in particular threads that are waiting for the monitor to be released.

The execution flow scheduler API is presented by a Java ExecutionFlowScheduler class. The ExecutionFlowScheduler class comprises a Java native method that is invoked to cause the low-level runtime to perform a context switch (i.e., an execution flow activation method). The context switch halts execution of the currently executing execution flow and saves its context. The context switch then restores and activates an execution flow context specified by the execution flow activation method. The Java system software of the system 100 comprises a single execution flow scheduler object created using this class. In some embodiments, as discussed below, the context switch may be accomplished by a non-native Java Scheduler by way of an object field.

The thread API is presented by a Thread class. An example implementation of the Thread class is shown in FIG. 2. One of ordinary skill will appreciate that this code sequence is presented by way of example only and other implementations are possible and fall within the scope of this disclosure. Functionality comprised in the Thread class is explained below with reference to this example implementation.

The Thread class extends an ExecutionFlow class and is designed to be extended, i.e., subclassed, by a Java application to create custom thread classes representing threads of the application. The thread API comprises a method to be invoked by the JVP 118 to execute the instructions of a thread, i.e., a run method (lines 8-12). In some embodiments, the run method is overridden by a custom Thread class extending the Thread class to provide an implementation that comprises the instructions of the thread. In other embodiments, the run method of the Thread class comprises an instruction sequence that causes a thread instruction sequence of a custom Thread class to be executed.

In some embodiments, the Thread class comprises a scheduling method that may be called by the Java operating system to cause a thread to be activated (lines 3-6). This scheduling method comprises instructions to invoke the execution flow activation method of an execution flow scheduler API to activate an execution flow context of a thread defined by a custom Thread class.

In various embodiments, the thread API may comprise additional methods and instance variables that are used by a Java thread scheduler to manage threads. For example, the Thread class may comprise methods to suspend the execution of a thread, to set the priority of a thread, and to resume a thread.

A Java scheduler API is presented by a Java thread scheduler. Embodiments of the Java thread scheduler implement a high-level thread scheduling policy (e.g., round robin, priority-based, and/or negotiated multimedia). In some embodiments, additional methods and instance variables included in the thread API are determined, at least in part, by the thread scheduling policy of the Java thread scheduler.

The thread abstraction as described above relates, in part, to abstracting Java threads for execution within a single processor such as the JVP 118. In addition, context switching is described as being accomplished by the APIs. In some embodiments, Java threads may be abstracted and executed within a plurality of processors, wherein the plurality of processors is abstracted. Furthermore, context switching may be accomplished by a non-native Java Scheduler (i.e., written entirely in Java) by way of an object field rather than relying solely on APIs to make the context switch.

Figure 3:
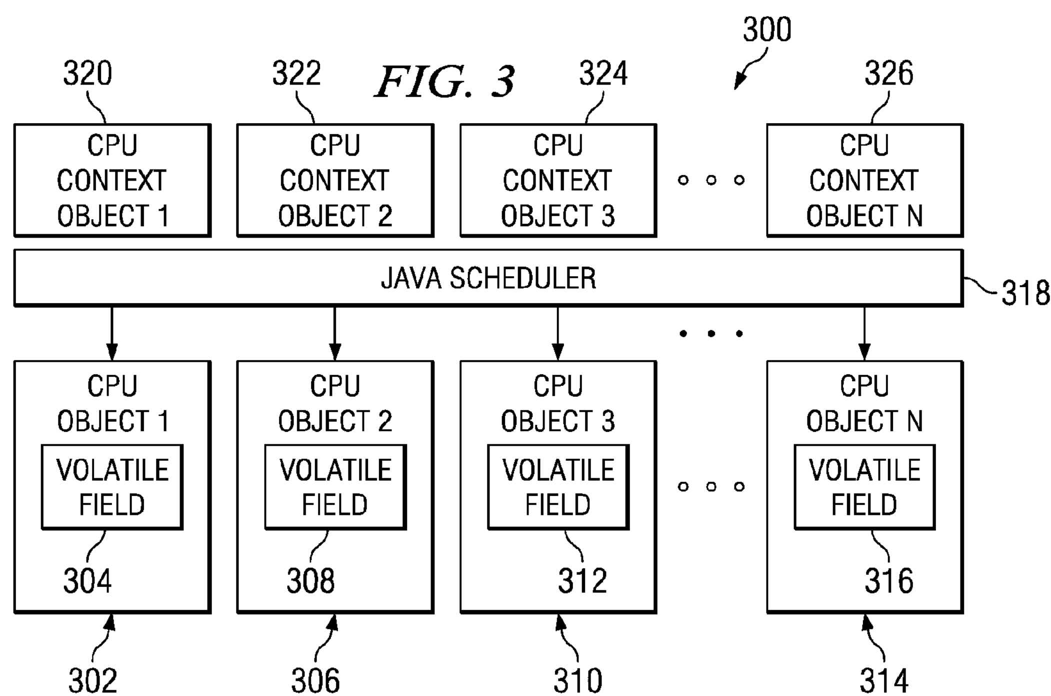
FIG. 3 illustrates a system in accordance with embodiments of the invention comprising a Java Scheduler.

The plurality of processors may be abstracted for example, by creating a JVP object by instantiating a JVP class. Java methods (e.g., comprised within a Java Thread class) may then be run on the instantiated JVP objects. FIG. 3 illustrates a system 300 comprising a plurality of abstracted processors, which are represented by CPU Objects 302, 306, 310, and 314. For the purposes of this disclosure, the CPU Objects may be equivalently referred to as JVP Objects. As shown, each CPU Object comprises a Volatile Field (e.g., Volatile Fields 304, 308, 312, 316 belonging to CPU Objects 302, 306, 310, and 314, respectively). In some exemplary embodiments, each of the Volatile Fields is named "CurrentSwContext" and serves to identify a particular CPU Context Object, such as CPU Context Objects 320, 322, 324, or 326, which are managed by the non-native Java Scheduler 318 running within the JVM 124 (FIG. 1). For the purposes of this disclosure, the CPU Context Objects, which can be viewed as thread abstractions, may be equivalently referred to as "JVPContext" Objects. In some embodiments, the CPU Context Objects may be instantiated by the Java Scheduler 318 or other Java software such as application software. In effect, a CPU Context Object is mapped onto a CPU Object by way of the Volatile Field as determined by the Scheduler 318 and methods (Method 1 or Method 2, discussed below) for execution within the CPU Object. In some embodiments, the system 300 may use the CPU Context Objects and the CurrentSwContext Volatile Fields to switch the currently running Java method within a CPU Object. In other embodiments, the system 300 may switch from running a Java method on one CPU Object to another CPU Object (e.g., system 300 may switch from CPU Object 302 to CPU Object 306).

The CPU Context Objects each represent a single execution flow within the system 300, and may be created by passing a reference to a static method to a constructor (e.g., a JVPContext constructor). Each CPU Context Object is independent from each other, and each CPU Context Object can be viewed as a Java thread abstraction. In addition, each CPU Context represents a particular CPU (or equivalently, JVP) state. When the CPU Context Object is created it is associated to both one CPU Object and one Java method. The Java method associated to the CPU Context Object then becomes the entry point for execution of instructions within the CPU Context Object. Furthermore, each Java bytecode starts and ends within the same CPU context.

In existing Java platforms, a Java scheduler is written in native code and executes one thread at one time on one CPU. In embodiments of the present invention, the Java Scheduler 318 is written entirely in Java and is not limited to scheduling and executing threads on a physical CPU such as the JSM 102 (FIG. 1). Instead, the Java Scheduler 318 sees the abstracted CPUs (CPU Objects) as the entirety of CPUs available for thread execution. Thus, the Java Scheduler 318 can execute, in parallel, any number of threads (represented by the CPU Context Objects) on any number of abstracted CPUs, and the Java Scheduler 318 determines which CPU context objects execute on which CPU objects. Regardless of the number of abstracted CPUs or the number of abstracted threads, the JEK 116 (FIG. 1) performs the physical realization of the thread execution upon the JVP 118 (FIG. 1).

Figure 4A:
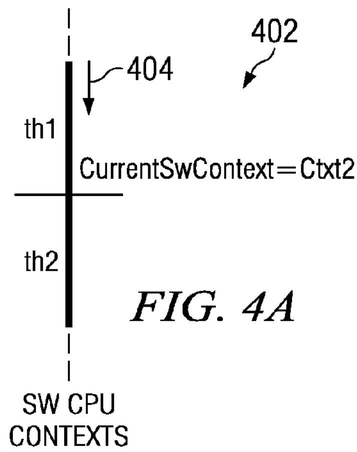
FIG. 4 illustrates methods in accordance with embodiments of the invention.
Figure 4B:
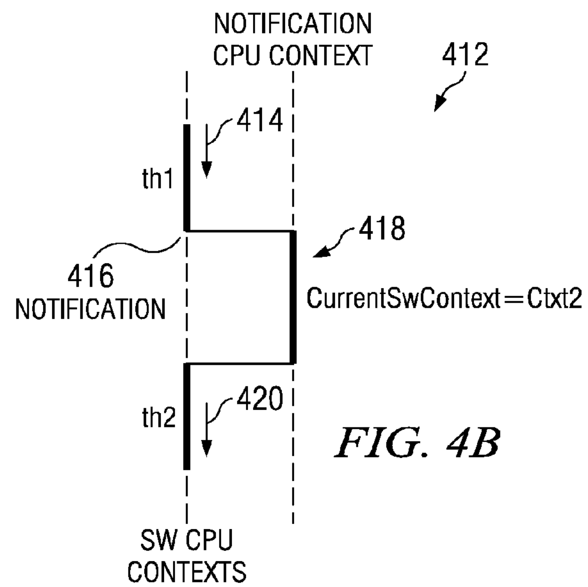
Figure 4C:
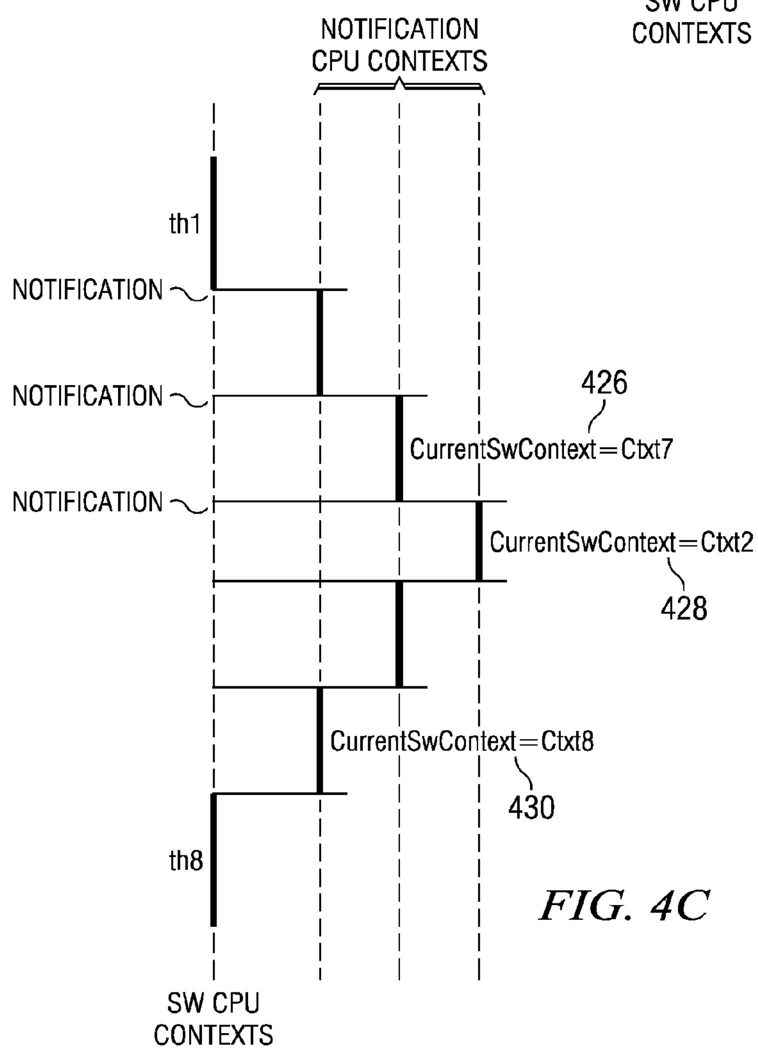

FIGS. 4A-4C illustrate context switching as performed by the Java Scheduler 318 by way of the Volatile Field of a CPU Object. In particular, FIG. 4A shows an example of context switching outside of a notification (i.e., no notifications occur). Java code 402 executing in the direction indicated by arrow 404 executes a first thread (thread 1 labeled as "th1", which corresponds to a CPU Context Object such as CPU Context Object 320, labeled as "CPU Context Object 1" in FIG. 3) then switches execution to a second thread (thread 2 labeled as "th2"). The switch occurs upon receiving a Java instruction to change the CurrentSwContext Volatile Field of the CPU Object (e.g., CPU Object 302, labeled as "CPU Object 1" in FIG. 3) upon which thread 1 is executing to Ctxt2. Ctxt2 corresponds to thread 2 and equivalently corresponds to a particular CPU Context Object such as CPU Context Object 322 (labeled as "CPU Context Object 2" in FIG. 3). At least two methods (shown below) are provided by the CPU Object for changing the CurrentSwContext Volatile Field, which effectively results in a context switch. These methods may be used to determine which CPU Context Object (i.e., which thread) should be executed on which CPU Object, as each CPU Context Object is associated to a particular CPU Object and to a particular method (as discussed above):

void setJVPContext (JvpContext ctx) (Method 1)

void setJVPContext (JvpContext ctx, Object mon) (Method 2)

Method 1 functions to remove the current CPU Context Object (i.e., the current thread, represented by "JvpContext" in Method 1 and Method 2) from the CPU Object upon which it was executing and replacing it with a new CPU Context object (i.e., a new thread, represented by "ctx" in Method 1 and Method 2). The context switch (as implemented according to Method 1 or Method 2) is accomplished by rewriting the CurrentSwContext Volatile Field of the CPU Object upon which a thread (i.e., a CPU Context Object) is executing.

Method 2 provides functionality similar to Method 1 and also provides a monitor "standby" mechanism, wherein the current (i.e., original) CPU Context Object is assumed to own a monitor (represented by "mon" in Method 2). Method 2 removes the current CPU Context Object from the CPU Object upon which it was executing while temporarily freeing the monitor for a new CPU Context Object to be executed on the CPU Object. The original CPU Context Object may reacquire the monitor once the new CPU Context Object has released the monitor, and the original CPU Context Object may once again execute. For both Method 1 and Method 2, "null" may be used as a valid argument for "JvpContext", wherein null indicates to the CPU Object that there is nothing to execute at the moment. Thus, considering the rewriting of the CurrentSwContext Volatile Field based on Method 1 or Method 2, the context switch is performed by using the Java Scheduler 318 (written entirely in Java) and modifying an object field of the CPU Object rather than relying on APIs to accomplish the context switch. This results in more efficient context switching.

FIGS. 4B and 4C illustrate CPU context switching during notifications. As shown in FIG. 4B for example, Java code 412 executing in the direction indicated by arrow 414 executes a first thread (thread 1 labeled as "th1"). While thread 1 is executing, a notification 416 is received which halts the execution of thread 1 and switches program execution flow to a notification CPU context 418. A Java instruction to change the CurrentSwContext Volatile Field to Ctxt2 is received while in the notification CPU context 418. Thus, when the notification expires, the Java code 412 continues to execute with thread 2, as indicated by arrow 420. For the case of nested notifications as shown in FIG. 4C, the Volatile Field may change multiple times. CurrentSwContext first changes to "Ctxt7" (arrow 426), then "Ctxt2" (arrow 428), and finally "Ctxt8" (arrow 430). The last value 430 ("Ctxt8" in FIG. 4C) of the CurrentSwContext Volatile Field is the value that is used to determine which thread (i.e., which CPU Context Object) to execute (on the CPU object) upon expiration of the notifications. In the example of FIG. 4C, the last value 430 of CurrentSwContext is "Ctxt8", which corresponds to thread 8 (indicated by "th8").

Figure 5:
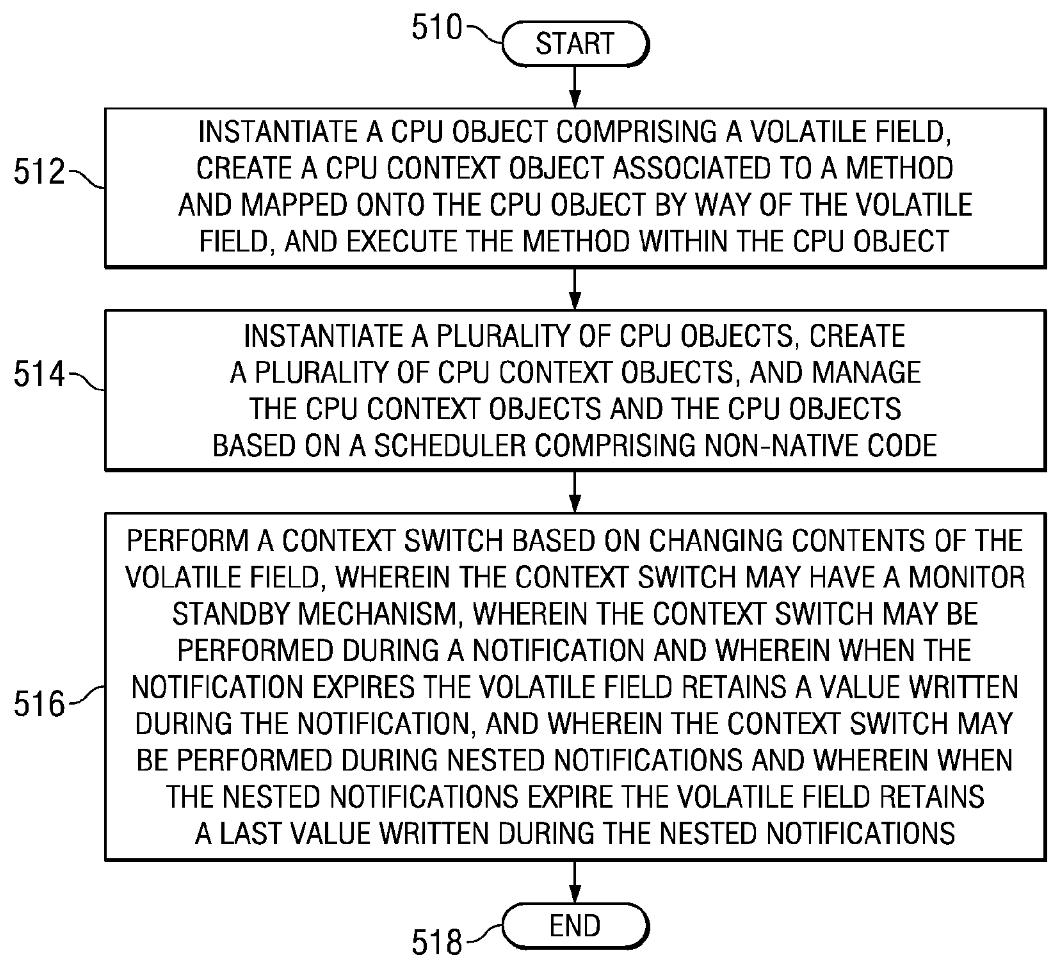
FIG. 5 illustrates a flow diagram in accordance with embodiments of the invention.

FIG. 5 illustrates a method (e.g., software) in accordance with some embodiments. In particular, the process starts (block 510) and proceeds to instantiating a CPU object comprising a volatile field (block 512), wherein the CPU object is an abstraction of a processor. A CPU context object is also created, wherein the CPU context object is a thread abstraction, and the CPU context object is associated to a method and mapped onto the CPU object by way of the volatile field. The method is executed within the CPU object. The process continues to instantiate a plurality of CPU objects (block 514). Each of the plurality of CPU objects comprises a volatile field. A plurality of CPU context objects is also created. The CPU objects and the CPU context objects are managed by a Java scheduler that is written entirely in Java (i.e., it does not comprise any native code). The Java scheduler can execute, in parallel, any number of threads (represented by the CPU context objects) on any number of abstracted CPUs (represented by the CPU objects). The process continues to perform a context switch based on changing contents of the volatile field (block 516). The context switch may have a monitor standby mechanism (as defined in Method 2 above). Also, the context switch may be performed during a notification, wherein when the notification expires the volatile field retains a value written during the notification. The context switch may also be performed during nested notifications, wherein when the nested notifications expire the volatile field retains a last value written during the nested notifications. The process then ends (block 518).

Figure 6:
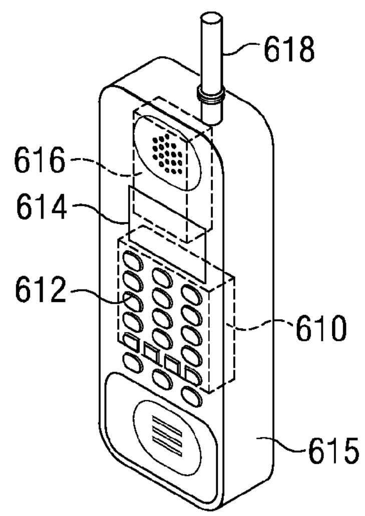
FIG. 6 illustrates a system in accordance with at least some embodiments of the invention.

System 100 (FIG. 1) may be implemented as a mobile cell phone such as that shown in FIG. 6. As shown, the mobile communication device has an outer enclosure 615 and includes an integrated keypad 612 and display 614. The JSM processor 102 and MPU processor 104 and other components may be included in electronics package 610 connected to the keypad 612, display 614, and radio frequency (RF) circuitry 616. The RF circuitry 616 may be connected to an antenna 618.

From the description provided herein, those skilled in the art are readily able to combine software created as described with appropriate general purpose or a special purpose computer hardware to create a computer system and/or computer subcomponents embodying aspects of the invention, to create a computer system and/or computer subcomponents for carrying out the method embodiments of the invention, and/or to create a computer-readable medium storing a software program to implement method aspects of the various embodiments. Moreover, the embodiments of the illustrative methods could be implemented together in a single program (with various subroutines), or split up into two or more programs executed on the processor.

While various embodiments of the invention have been shown and described, modifications thereof can be made by one skilled in the art without departing from the spirit and teachings of the invention. The embodiments described herein are illustrative only, and are not intended to be limiting. Numerous variations and modifications will become apparent to those skilled in the art once the above disclosure is fully appreciated. It is intended that the following claims be interpreted to embrace all such variations and modifications.

What is claimed is:

1. A non-transitory computer-readable medium storing a program that, when executed by a processor of a host system, causes the processor to:

- instantiate a CPU object that represents a processor abstraction, wherein the CPU object comprises a volatile field;
- create a CPU context object that represents a thread abstraction, wherein the CPU context object is associated to a method, and wherein the CPU context object is mapped onto the CPU object, wherein the CPU context object is mapped onto the CPU object by way of the volatile field, wherein a scheduler executes at least two CPU context objects in parallel on at least two CPU objects; and
- execute the method within the CPU object.

2. The computer-readable medium according to claim 1 wherein the program further causes the processor to instantiate a plurality of CPU objects.

3. The computer-readable medium according to claim 1 wherein the program further causes the processor to create a plurality of CPU context objects.

4. The computer-readable medium according to claim 1 wherein the program further causes the processor to manage the CPU context object and the CPU object based on the scheduler comprising non-native code, wherein the scheduler determines which CPU context objects execute on which CPU objects.

5. The computer-readable medium according to claim 1 wherein the program further causes the processor to perform a context switch based on changing contents of the volatile field.

6. The computer-readable medium according to claim 1 wherein the program further causes the processor to perform a context switch, wherein the context switch has a monitor standby mechanism.

7. The computer-readable medium according to claim 5 wherein the program further causes the processor to perform a context switch during a notification, wherein the contents of the volatile field are changed during the notification, and wherein when the notification expires the volatile field retains a value written during the notification.

8. The computer-readable medium according to claim 5 wherein the program further causes the processor to perform a context switch during nested notifications, wherein the contents of the volatile field are changed during the nested notifications, and wherein when the nested notifications expire the volatile field retains a last value written during the nested notifications.

9. A computer system comprising:

- a processor that executes bytecodes; and
- a memory coupled to the processor;
- wherein the processor instantiates a CPU object that represents a processor abstraction, the CPU object comprising a volatile field;
- wherein the processor creates CPU context object that represents a thread abstraction, wherein the CPU context object is associated to a method, and wherein the CPU context object is mapped onto the CPU object by way of the volatile field, wherein a scheduler executes at least two CPU context objects in parallel on at least two CPU objects; and
- wherein the processor executes the method within the CPU object.

10. The computer system according to claim 9 further comprising wherein the processor instantiates a plurality of CPU objects.

11. The computer system according to claim 9 further comprising wherein the processor creates a plurality of CPU context objects.

12. The computer system according to claim 9 further comprising wherein the processor to manage the CPU context object and the CPU object based on the scheduler comprising non-native code, wherein the scheduler determines which CPU context objects execute on which CPU objects.

13. The computer system according to claim 9 further comprising wherein the processor performs a context switch based on changing contents of the volatile field.

14. The computer system according to claim 9 further comprising wherein the processor performs a context switch, wherein the context switch has a monitor standby mechanism.

15. The computer system according to claim 13 further comprising wherein the processor performs a context switch during a notification, wherein the contents of the volatile field are changed during the notification, and wherein when the notification expires the volatile field retains a value written during the notification.

16. The computer system according to claim 13 further comprising wherein the processor performs a context switch during nested notifications, wherein the contents of the volatile field are changed during the nested notifications, and wherein when the nested notifications expire the volatile field retains a last value written during the nested notifications.

17. The computer system according to claim 9 further comprising wherein the processor executes a method for changing contents of the volatile field to effectively perform a context switch, wherein the method is defined by at least a context object argument.

18. The computer system according to claim 9 further comprising wherein the processor executes a method for changing contents of the volatile field to effectively perform a context switch, wherein the method is defined by at least a context object argument and a monitor object argument.

* * * * *